United States Patent Office 3,435,956
Patented Apr. 1, 1969

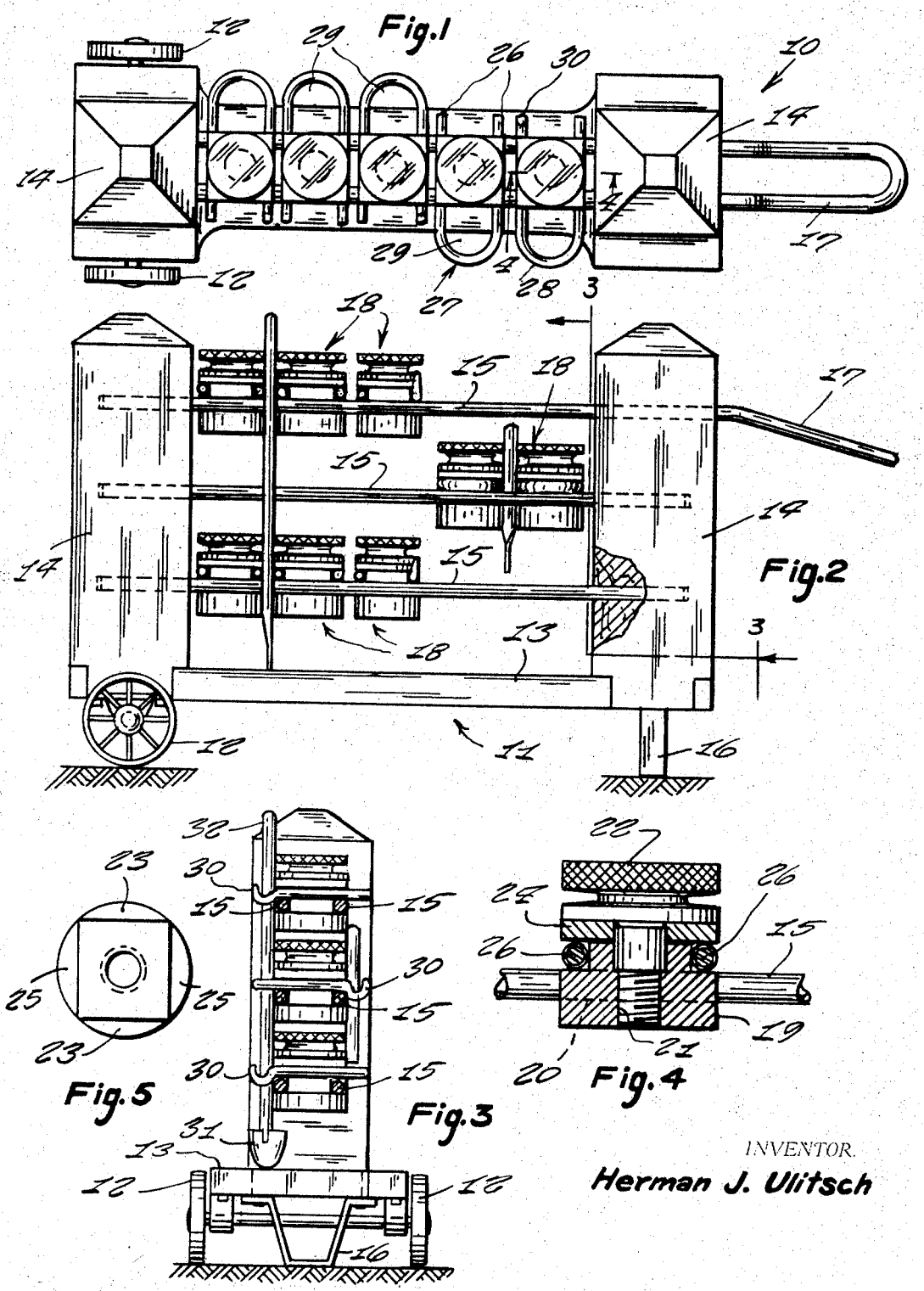

3,435,956
LANDSCAPER'S UTILITY CART
Herman J. Ulitsch, 16980 MacArthur,
Detroit, Mich. 48240
Filed July 20, 1967, Ser. No. 654,783
Int. Cl. A47f 7/00; B63b 11/00, 3/00
U.S. Cl. 211—60       2 Claims

ABSTRACT OF THE DISCLOSURE

A utility cart for a gardener or handyman, the cart including a series of retainers for securing various tools upon the cart, the retainers being adjustable so to suit various sizes of tools.

---

This invention relates generally to utility carts for gardeners and handymen.

A principal object of the present invention is to provide a landscaper's cart for the purpose of supporting various kinds of tools generally used in landscaping and gardening work.

Another object of the present invention is to provide a landscaper's cart which is provided with a plurality of retainers so to support various kinds of tools by their handles.

Yet a further object of the present invention is to provide a landscaper's cart wherein the retainers are adjustable so as to fit particularly the distinct shape of various tools.

Still another object of the present invention is to provide a landscaper's cart wherein the retainers are positioned to accommodate long-handled tools as well as short-handled tools.

Other objects of the present invention are to provide a landscaper's cart which is simple in design, inexpensive to manufacture, rugged in construction, easy to use and efficient in operation.

These and other objects will be readily evident upon a study of the following specification and the accompanying drawing wherein:

FIGURE 1 is a top plan view of a cart embodying the present invention;

FIGURE 2 is a side elevation view thereof and shown partly in cross section;

FIGURE 3 is a cross-sectional view shown partly in elevation as viewed along line 3—3 of FIGURE 2;

FIGURE 4 is an enlarged vertical sectional detail on the longitudinal center of FIGURE 1;

FIGURE 5 is a top plan view of the bottom member of the unit shown in FIGURE 4.

Referring now to the drawing in detail, the reference numeral 10 represents a landscaper's utility cart according to the present invention wherein there is a chassis 11 supported at one end upon a pair of front wheels 12, the chassis comprising a frame including a platform 13 having a pair of upstanding stanchions 14 at opposite ends of the platform, the stanchions providing support means for a plurality of spaced apart pairs of rods 15.

A bracket 16 mounted beneath the underside of platform 13 forms a rear leg for the cart. A handle bar 17 extending rearwardly of the cart may be made, if preferred by a continuation of the uppemost pair of rods 15, the rearend of the handle bar being rounded as is shown in FIGURE 1 of the drawing.

A plurality of retainers 18 are carried upon each pair of rods 15 for the purpose of securing and supporting various tools by their handles upon the cart. Each of the retainers 18 is comprised of a block 19 of generally rectangular configuration each block 19 having a pair of openings 20 therethrough so as to receive the rods 15, the blocks 19 being accordingly slideable along the rods 15. Each of the blocks 19 has a central, vertical threaded opening 21 into which a threaded thumb screw 22 is received. It is to be understood that the openings 20 may be substituted by grooves 23 upon opposite sides of the block as is shown in FIGURE 5 of the drawing. A lock washer 24 is positioned between the thumb screw and block 19 so as to bear down against the rods 15 when desiring to secure the retainer in a particular location along the rods. Another groove 25 upon opposite sides of the block 19 is provided for receiving the parallel legs 26 of a U-shaped yoke 27, the yoke having a semi-circular intermediate portion 28 to form an opening 29 into which the handle of various garden tools may be inserted. As is readily evident in FIGURE 4 of the drawing, the thumb screw 22 will also serve to secure the yoke relative to the block, it being understood that the yoke is slideable along the grooves 25 so as to produce a relatively larger or smaller opening 29 for various kinds and shapes of tools.

The terminal ends of the legs 26 may be turned to form hooks 30 for the purpose of supporting various small tools hung thereupon.

It is of course understood that the yokes may be made to slide out of the grooves 25 and the yokes may be reversed from one side of the cart to an opposite side if so preferred. Accordingly the yokes are reversible in direction.

In operative use the cart may be wheeled out to an area where landscaping work is to be performed. Long handled tools may be held upon the cart by engaging the handle of the tool in the upper retainers while short handled tools are engageable by the lower positioned retainers. Thus as is shown in FIGURE 3 of the drawing the shovel 31 has a long handle 32, the lower end of the shovel resting upon the platform 13, and the upper end of the handle 32 being secured by the retainers particularly held upon the uppermost of the pairs of rods 15. It is to be understood that the tools may be placed with the handles up or with the handles down upon the cart.

The yokes 27 should preferably be rubber covered especially in the areas of the semi-circular mid-portion so as to not rattle the tool handle.

I claim:

1. In a landscaper's tool-carrying cart characterized by a frame and support means including wheels, the improved tool-retaining means which comprises:
   a bottom platform secured to the frame;
   a plurality of vertically spaced and aligned pairs of parallel horizontal rods longitudinally secured to said frame above said platform, each pair comprising two horizontally and laterally spaced parallel rods;
   a plurality of tool-retaining blocks, each slidably mounted on one of said rod pairs, each block including clamping means for locking it in a desired position on such rod pair, and each block including a pair of parallel horizontally spaced and laterally directed yieldable projections;

whereby tools of any length can be carried by the cart by standing the tool vertically on said platform and retaining the handle thereof between a projection of each of two adjacent blocks on one of said rod pairs.

2. The cart of claim 1 wherein said projections comprise the ends of a U-shaped yoke horizontally mounted in each of said retaining blocks, and wherein said block clamping means comprises a thumb screw threaded downwardly into each of said blocks, the head of said thumb screw bearing on a lock washer which in turn clamps said yoke against the associated rod pair to thereby adjustably retain both said block on said rod pair and to retain said yoke in said block.

References Cited

UNITED STATES PATENTS

| 1,698,318 | 1/1929 | Norton | 211—69 |
| 3,145,031 | 8/1964 | Wilkinson | 280—47.35 |

LEO FRIAGLIA, *Primary Examiner.*

ROBERT R. SONG, *Assistant Examiner.*

U.S. Cl. X.R.

280—47.35